M. PIONZIO-CAVAGNINO.
MACHINE FOR REGISTERING COMMERCIAL TRANSACTIONS BY DOUBLE ENTRY.
APPLICATION FILED FEB. 28, 1906.

915,474.

Patented Mar. 16, 1909.

3 SHEETS—SHEET 1.

WITNESSES: W. M. Avery, A. H. Davis.

INVENTOR Matilde Pionzio Cavagnino
BY Munn & Co.
ATTORNEYS

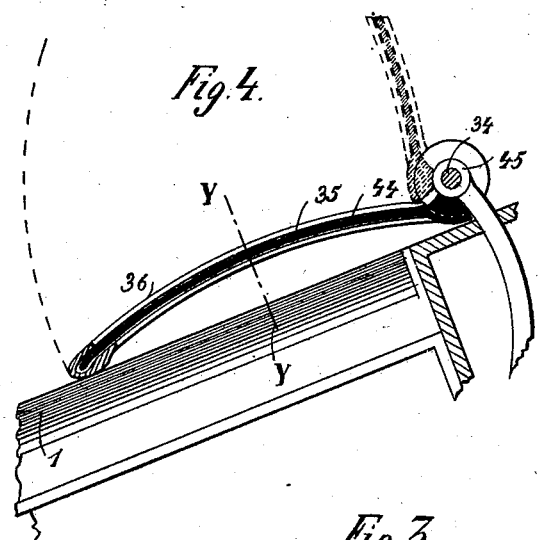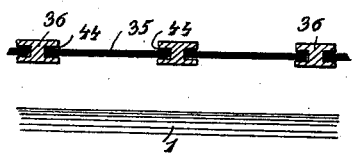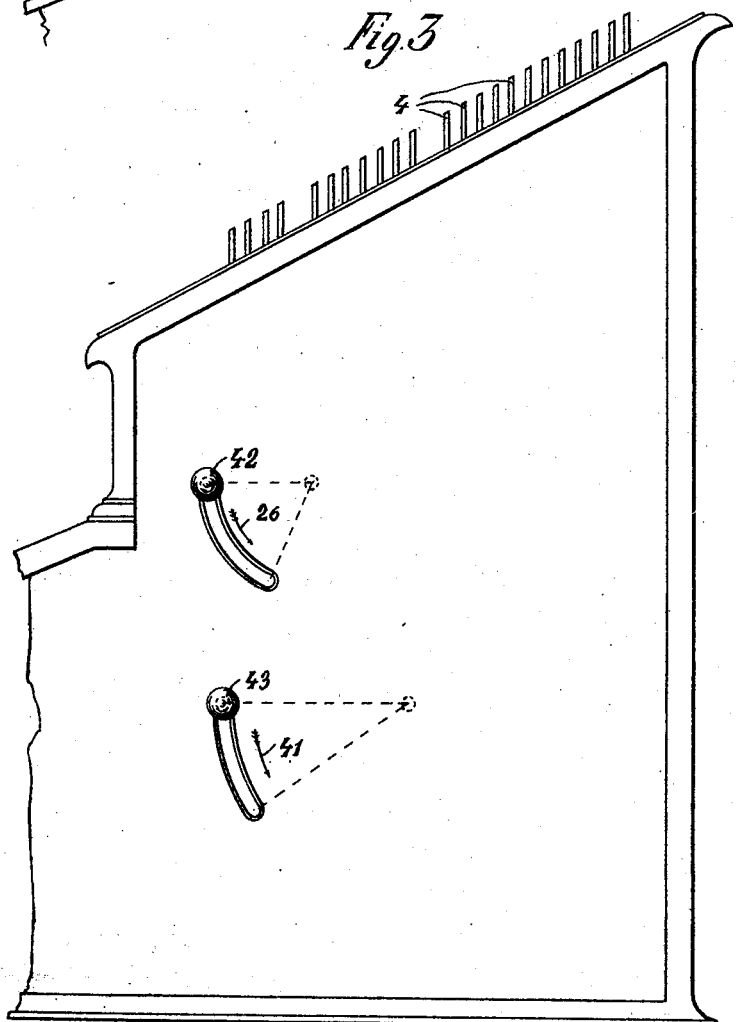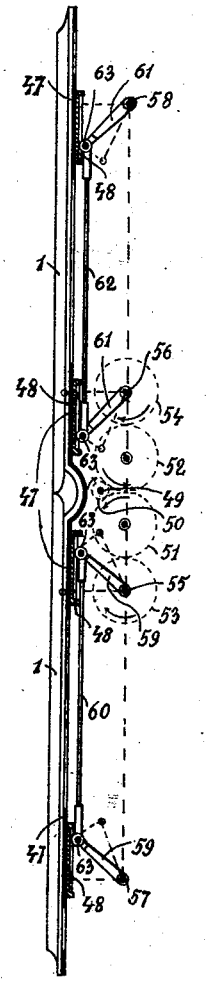

M. PIONZIO-CAVAGNINO.
MACHINE FOR REGISTERING COMMERCIAL TRANSACTIONS BY DOUBLE ENTRY.
APPLICATION FILED FEB. 28, 1906.
915,474.
Patented Mar. 16, 1909.
3 SHEETS—SHEET 3.
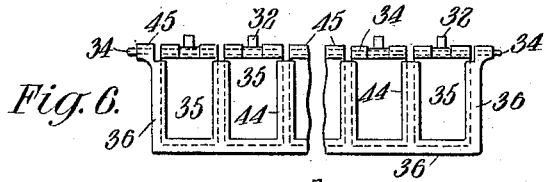
Fig. 6.
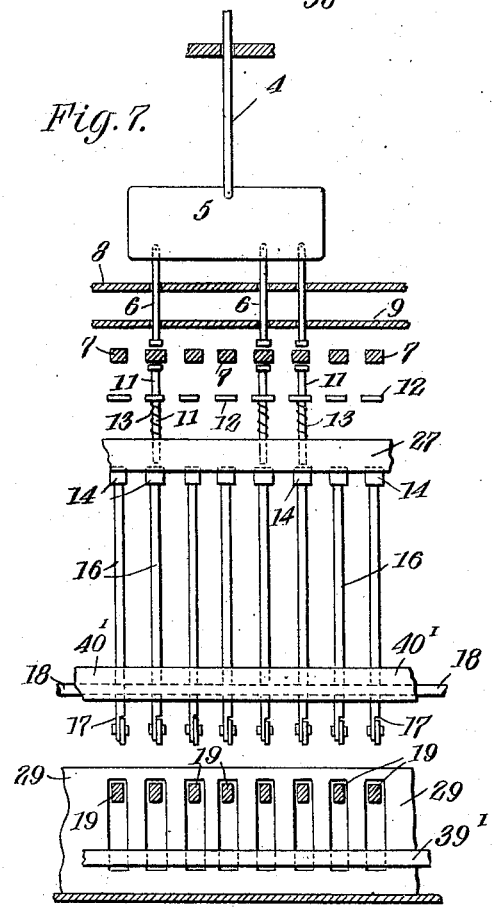
Fig. 7.
Fig. 8.
| CASH. | BILLS TO BE CASHED. | BILLS TO BE PAID. | GENERAL EXPENSES. |
|---|---|---|---|
| Debit  Credit | Debit  Credit | Debit  Credit | Debit  Credit |
WITNESSES
Samuel E. Wade
C. E. Trainor
INVENTOR
MATILDE P. CAVAGNINO.
BY Munn & Co.
ATTORNEYS

UNITED STATES PATENT OFFICE.

MATILDE PIONZIO-CAVAGNINO, OF TURIN, ITALY.

MACHINE FOR REGISTERING COMMERCIAL TRANSACTIONS BY DOUBLE ENTRY.

No. 915,474. Specification of Letters Patent. Patented March 16, 1909.

Original application filed February 8, 1905, Serial No. 244,726. Divided and this application filed February 28, 1906.
Serial No. 303,486.

*To all whom it may concern:*

Be it known that I, MATILDE PIONZIO-CAVAGNINO, a subject of the King of Italy, residing at Turin, in the Kingdom of Italy, have invented certain new and useful Improvements in Machines for Registering Commercial Transactions by Double Entry, as originally set forth in my United States application, Serial No. 244,726, filed February 8, 1905, of which the present application is a division; and I do hereby declare the following to be a full, clear, and exact description of the same.

This invention refers to a machine intended for the purpose of registering the commercial transactions connected with a business according to the rules of double entry book-keeping. Said machine is fitted with a suitable number of keys corresponding to the various operations that it may be required to perform, each of which keys is connected with auxiliary devices making apparent to the operator the necessary directions for the registration of the transaction effected so that it may be duly recorded on suitable sheets of paper.

This machine insures the complete, uniform and exact book-keeping without requiring the work of an experienced accountant, a person with a slight knowledge of book-keeping being sufficient.

A form of application of the machine is described hereinafter, reference being had to the accompanying drawings in which—

Figure 1A:
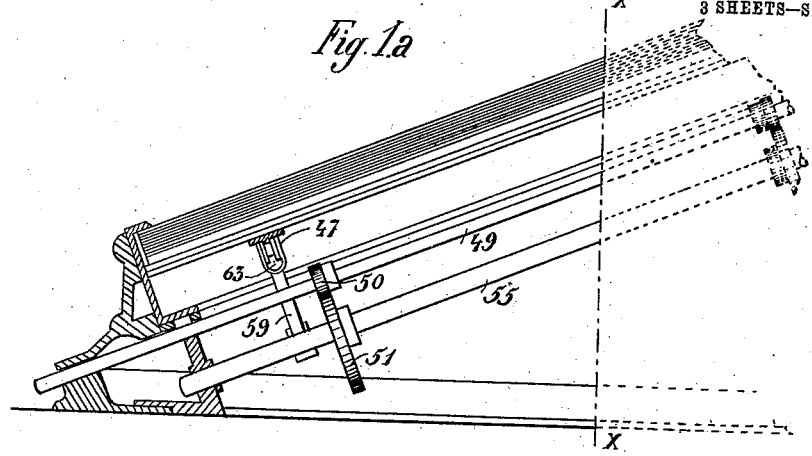
Figure 1B:
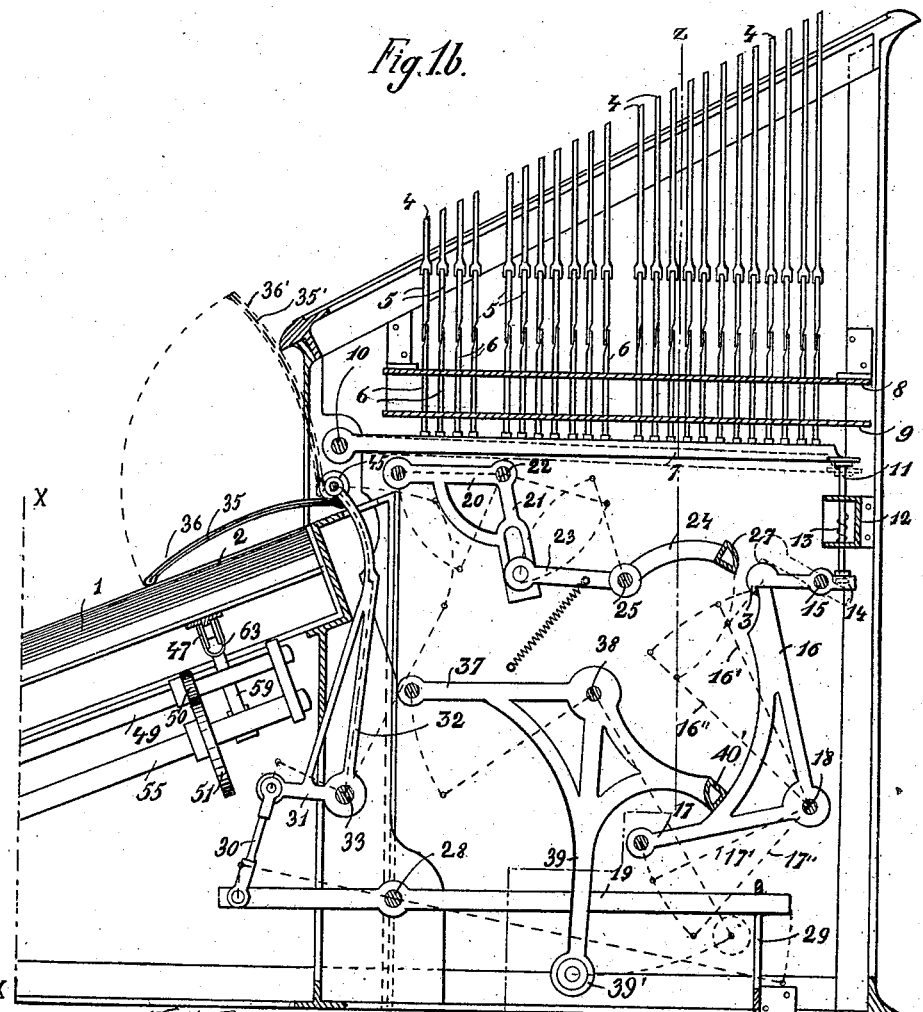

Figures 1$^a$ and 1$^b$, taking them together, are the longitudinal section of the same being Fig. 1$^b$— the continuation of Fig. —1$^a$—, to the right of the line —XX—; Fig. 2 shows the equalizing apparatus for the adjustment of the visible sides of the ledger; Fig. 3 shows a side outer elevation of the machine; Fig. 4 shows, in enlarged scale, a cover of the headings; Fig. 5 is a section on line —YY— of Fig. 4; Fig. 6 is a partial plan of the head covers, and Fig. 7 is a partial section on the line z—z of Fig. 1$^b$. Fig. 8 is a view of some of the headings of the ledger.

In my U. S. application Serial No. 244,726 was described a form, that required the use of two strips of paper for the journal and the day-book, and of two sheets for the accounts; these sheets were to be looked upon as vouchers and fundamental records, as the particulars registered by the machine had to be copied into the general register.

According to the present new form of application the items are posted directly in a book; consequently all the paper-carrying drums, all the toothed wheels and corresponding driving mechanisms of the application above-mentioned are taken off; the two sheets of paper are replaced by the register 1.

The register has as many columns as there are accounts and these columns have their respective headings —2— which are all screened by the covers 35, Figs. 4 and 6, when no entry is to be made, but they are uncovered when it is necessary to write an account, and this is performed in the manner hereinafter described.

It will be understood that only those columns are uncovered which relate to the transaction to be recorded.

Each of the keys —4— corresponds to a single operation. Each key is fastened to a plate —5— Figs. 1$^b$ and 7, to which are connected as many rods —6— as there are accounts to be entered; the rods —6— act on the horizontal account levers —7— which are twenty in number, that is to say one for each account; to each plate —5— only those levers —7— shall correspond which relate to the transaction to be recorded. The rods —6— are guided in their movement by the perforated plates —8— and —9—.

Each lever —7— is rotatable about the pivot —10— and its extremity bears against the rod —11— which runs vertically through the box 12, and is regulated by the spring 13. The rod —11— presses in its turn on lever —14— turning on shaft —15— and which by means of a tooth grips the extremity of the arm —16— of the angle-lever —16—17— turning on the shaft —18—. When a lever —7— is lowered, the angle lever 16—17 is released, its arms assuming positions —16'— —17'—; the said lever is stopped by the rod 19 destined to uncover one of the headings of the register, as will be described hereinafter the rods 19 are also twenty in number, as are the accounts.

In the aforesaid position of the mechanism the key 42 opening the accounts is made to act, which key is placed on the right hand side of the machine (Fig. 3) and is affixed to the extremity of arm 20 of the angle lever 20—21 (Fig. 1ᵇ) turning on shaft 22, connected to the angle-lever 23—24 turning on shaft 25 the arm 24 is provided at its extremity with a rod 27 extending transversely throughout the length of the machine.

The lever 20—21 being rotated in the direction of the arrow 26, the rod 27 meets all the arms 16'— of the levers 16—17 which have been lowered, and carries them to position 16"—; the arm 17, passing from position 17' to position 17", lowers rod 19 which is rotatable on the shaft 28 guided by the openings of a comb-like plate 29. The rod 19 is connected at one end to a connecting-rod 30, connected in its turn with the arm 31 of the angle-lever 31—32 turning on the shaft 33; the arm 32 is connected at its extremity with the plate 35 which covers one of the headings of the register; —1—; this plate slides in the grooves 44 of a frame-work 36 (Figs. 4, 5 and 6) which extends throughout the length of the machine; the plates 35 and the frame-work 36 are provided with collars 45 rotatable each about a distinct axle 34; these axles in the position shown in the drawing, are all on the same straight line, so that on the general frame-work 36 being raised, it carries with it all the headings of the register uncovered; this operation is requisite when it must turn over the pages of the register. The plate 35 and the frame-work 36, will, after rotation, assume position 35' —36'— (Fig. 1). It will be understood that this rotation will be prevented, when one or more of the plates 35 are not in their resting position, and this occurs when a rod 19 is lowered, for then the arm 32 recedes, turning on shaft 33, causing the corresponding plate 35 to recede likewise; this movement effects the uncovering of the corresponding heading of the register and this serves as an indication to the operator to set down the necessary entries in the corresponding column. These entries having been made, all the mechanism must be carried back to its initial position, so as to be in readiness for the registering of new transactions. To this end the key 43 closing the accounts (Fig. 3), is made to act, which key is placed on the right hand side of the machine, and is affixed to the extremity of the arm 37 of a lever, which turns on pivot 38, and to which are connected the two arms 39 and 40, and furnished at their ends respectively with rods 39' and 40' extending transversely through the length of the machine; these arms 39 and 40 rotating in the direction of the arrow 41 thrust back by means of said rods 39' and 40' respectively to the resting position the rods 19 and the angle-levers 16—17 as shown in the drawings. The register 1 used in connection with said machine is a thick volume strongly bound.

The two pages on the right and left hand sides of the open register must be on the same level and in contact with the covers 35 (Fig. 4) for the closing of the headings, as, otherwise, the exact correspondency between the columns of the register and the openings uncovered for the entering of the accounts might be lacking, which correspondency is an essential condition for the accurate working of the machine. And, as by the gradual turning over of the leaves the volume increases in size, on one side and decreases correspondingly on the other, the equalization is obtained by means of the contrivance shown in Fig. 2. The register rests on a backing piece 47 supported by the frame 48. An axle 49 runs underneath the back of the register; it is fitted at each end (Fig. 1ᵃ. 1ᵇ. and 2) with a toothed pinion 50 in gear with the wheels 51 and 52, which, in their turn, gear with the toothed wheels 53, and 54; toward the external edges of the register, there are, besides, the axles 57 and 58; the lever arms 59 fitted on the axles 55 and 57, together with the connecting rod 60 form an articulated engine, and the same arrangement is adopted for the lever-arms 61 mounted on the axles 56 and 58, and hinged to the connecting rod 62; the lever-arms 59 are inclined in a direction, the reverse of those marked 61. The frame 48 rests against the rollers 63 set on the articulations of the engines above mentioned. It is evident that by causing the central axle 49 to rotate, by means of a handle, all the aforesaid parts will be set in motion, and that if the left side of the register is lowered, the right side will be raised and vice versa. In the drawing a practical example has been indicated by means of arrows; it is what actually occurs, as, in consequence of the turning over of the pages, the volume increases in size on the left, and decreases on the right hand side; thus to equalize the pages, the left side of the register must be lowered and the right side raised.

What I claim and desire to secure by Letters Patent is:

1. In a machine for registering commercial transactions, the combination with a ledger support, of shutters for normally concealing the headings of the ledger columns, means for moving the shutters for uncovering the headings, a key corresponding to each cover, and means whereby the depression of a key will connect the corresponding cover with the moving means.

2. In a machine for registering commercial transactions, the combination with a ledger support, of means for normally covering the headings of the ledger columns, means for independently moving said covering means, to uncover the corresponding heading, and means for simultaneously moving the covers to their original position.

3. In a machine for registering commercial transactions, means for supporting a ledger in open position, comprising a support for each side thereof, a shaft arranged longitudinally of the ledger at the center thereof, a connection between the shaft and the respective side supports whereby the rotation of the shaft will lower one side of the ledger and raise the other side, means for normally covering the headings of the ledger columns, means for independently moving said covering means to uncover the corresponding heading, and means for simultaneously moving the covers to their original positions.

4. In a machine of the class described, the combination with the ledger support, of shutters for normally covering the headings of the ledger columns, means for moving each shutter from over the respective heading, means common to all the shutters for operating the moving means, means for connecting each of said moving means with the common operating means, and means common to all the shutters for returning them to their original position.

5. In a machine of the class described, the combination with the ledger support of shutters for normally covering the headings of the ledger columns, a frame in which said shutters are slidable, means for moving each shutter from over its respective heading, means common to all the shutters for operating the moving means, means for connecting each of said moving means with the common operating means, means common to all the shutters for returning them to their original position, and means whereby to swing the frame to simultaneously uncover all of the headings.

6. In a machine of the class described, the combination with the ledger support, of shutters for normally covering the headings of the ledger columns, a frame in which said shutters are slidable, a plurality of angle levers pivoted coaxially one with the other, each of said levers having one of the arms thereof connected with a shutter, means for supplying power for operating the angle levers whereby to move the shutters from over the headings, means for bringing said power supplying means and the individual levers into operative relation and means common to all the shutters for returning them to their original position.

7. In a machine of the class described, the combination with the ledger support, of shutters for normally covering the headings of the ledger columns, a frame in which said shutters are slidable, a plurality of angle levers pivoted coaxially one with the other, each of said levers having one of the arms thereof connected with the shutter, means for supplying power for operating the angle levers whereby to move the shutters from over the headings, means for bringing said power supplying means and the individual levers into operative relation, and means common to all the shutters for returning them to their original position.

8. In a machine of the class described, the combination with a ledger support, of shutters for normally covering the headings of the ledger columns, means for applying power for operating all of the shutters, means for connecting the individual shutters with said power applying means, and a single means for returning all of the shutters to their original position.

In testimony whereof I have signed this specification in the presence of two subscribing witnesses.

MATILDE PIONZIO-CAVAGNINO.

Witnesses:
   GOTTARDO C. PIRONI,
   MARIO ERIBRENDINO.